United States Patent [19]
Tischler

[11] 3,946,753
[45] Mar. 30, 1976

[54] PRESSURE SWITCH BRINE SHUT-OFF

[75] Inventor: Edward J. Tischler, St. Paul, Minn.

[73] Assignee: Ecodyne Corporation, Lincolnshire, Ill.

[22] Filed: Feb. 6, 1974

[21] Appl. No.: 440,228

[52] U.S. Cl. ............... 137/268; 137/386; 210/104
[51] Int. Cl.² ......................................... B01D 23/20
[58] Field of Search ........... 210/103, 104, 105, 139, 210/140, 190, 191, 119; 137/268, 386

[56] References Cited
UNITED STATES PATENTS

| | | | |
|---|---|---|---|
| 1,939,183 | 12/1933 | Neuman | 210/139 |
| 2,065,962 | 12/1936 | Bowers | 210/104 X |
| 2,935,196 | 5/1960 | Miller | 210/104 |
| 3,028,963 | 4/1962 | Rose | 210/139 |
| 3,044,626 | 7/1962 | Rose | 210/103 |
| 3,066,801 | 12/1962 | Lundeen | 210/140 X |
| 3,308,955 | 3/1967 | Robarge | 210/139 |
| 3,467,255 | 9/1969 | Whitlock | 210/105 |
| 3,531,402 | 9/1970 | Thompson | 210/140 |
| 3,844,309 | 10/1974 | Tischler | 210/119 |

*Primary Examiner*—Theodore A. Granger
*Attorney, Agent, or Firm*—Joel E. Siegel

[57] ABSTRACT

A brine system to manufacture brine for the regeneration of ion exchange material including a brine well positioned within a brine drum. A vertically adjustable air chamber activates a diaphragm and control arm assembly which in turn controls inlet shut-off valves associated with the brine well when the water level within the drum reaches a predetermined level. The control arm has a unique cam arrangement associated therewith which prevents premature shut-off of the valves. Water enters and is withdrawn from the brine well through a down tube having a vertically adjustable lower end extending down into the brine well to a predetermined level and an upper end in communication with the shut-off valves through a series of passageways and chambers. A floating disc seal is provided within one of these chambers to shut-off the air entering the chamber after the brine is drawn down to a level below the lower end of the down tube.

12 Claims, 1 Drawing Figure

U.S. Patent   March 30, 1976   3,946,753
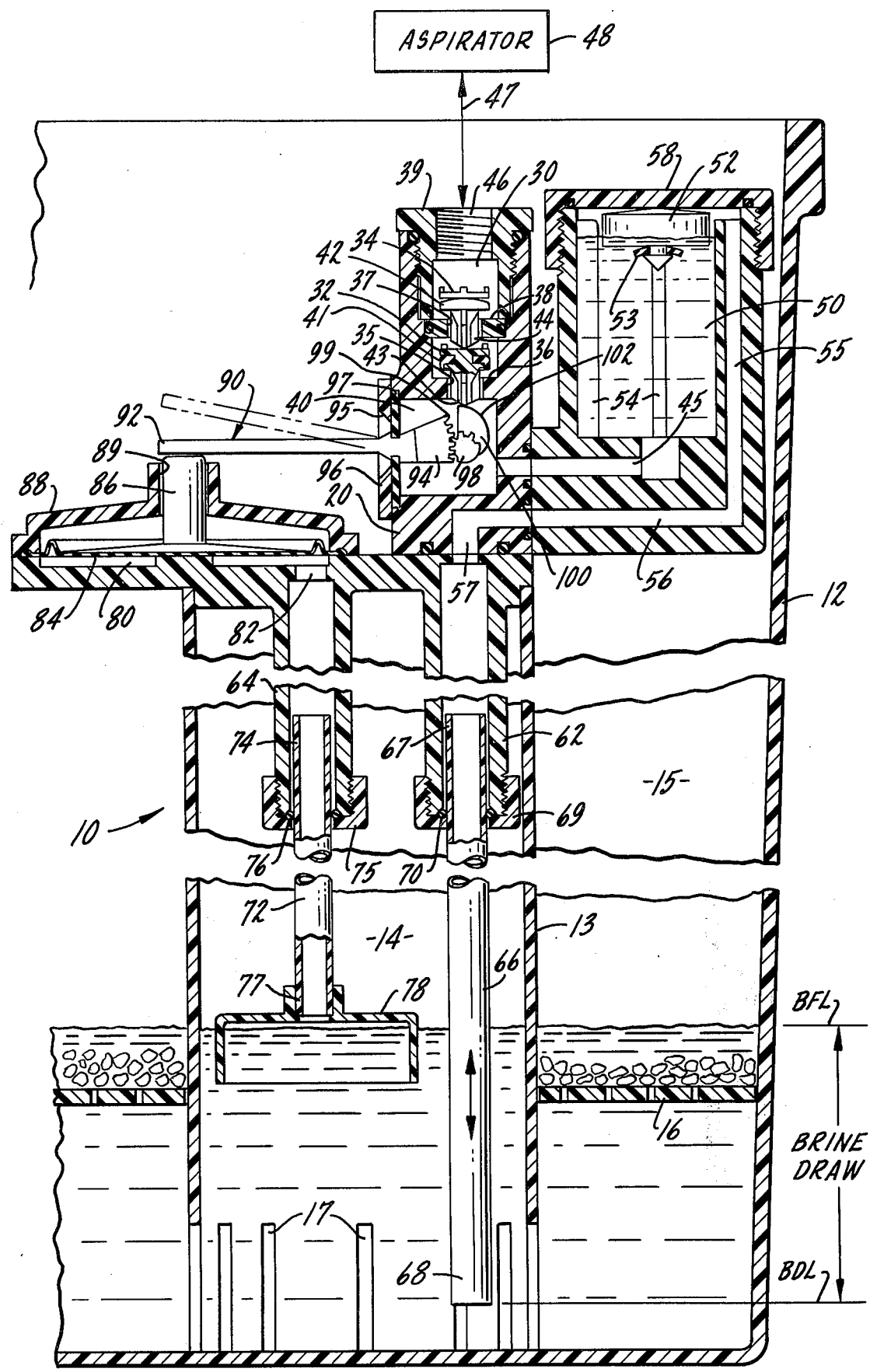

PRESSURE SWITCH BRINE SHUT-OFF

BACKGROUND OF THE INVENTION

This invention relates in general to a water conditioning system. It deals more particularly with the regeneration of ion exchange material.

Water softening with ion exchange material such as resin particles or the like is well known in the art. During the softening process or service cycle, the ion exchange resin particles acquire hardness inducing ions from the water in exchange for "soft ions", or ions which do not induce hardness. After prolonged contact of the resin particles with the raw water, their ion exchange capacity is diminished considerably and regeneration of the ion particles must be accomplished. Regeneration is conventionally accomplished by contacting the resin particles with the brine solution, viz an aqueous solution of sodium chloride or potassium chloride or the like.

The ion exchange process and the regeneration of ion exchange material are conventionally accomplished in a resin tank, while a separate brine tank is employed to manufacture and store brine between regeneration cycles. Whe regeneration is initiated in the water conditioning system by a suitable timing means control valve arrangement, brine is drawn from the brine tank and passed through the bed of ion exchange material in the resin tank to revitalize the bed by removing hardness inducing ions from it and replacing them with sodium ions from the brine solution.

Actually, as is well known, the regeneration of an ion exchange resin bed in a water conditioning system normally comprises several treatment cycles in addition to brining. These might include fresh water backwash of the ion exchange bed X, in addition, rinsing of the bed with fresh water to remove residual brine and other foreign material. It is normally during a rinsing cycle, subsequent to brining, that the brine tank water supply is replenished to create more brine for the next regeneration period. After a predetermined amount of fresh water has been introduced to the brine tank, brine tank refill is terminated and the brine system is at rest pending a signal from the timing device control valve for another regeneration.

Present water conditioning systems usually incorporate a float to regulate brine draw or function as an added safety feature to prevent the overflowing of the brine drum. To accomplish this double safety feature, a shut-off valve is built into the main valve body. On some water conditioning units the only shut-off device is in the float which is susceptible to malfunction and overflowing of the brine drum. This is especially objectionable because all the salt will eventually dissolve and go down the drain. Another objectionable occurrence is the tendency for premature shut-off especially if air enters the system. A fast refill rate, especially at high water pressure, tends to lift the float and shut-off before the water reaches its intended level. Most float valves incorporate a flow restrictor to overcome this tendency, but in commercial two tank units it is detrimental in that the brine drum must refill quickly enough to make up brine for units regenerating in sequence. In placing a float valve in a brine drum, it must be set inside a cylindrical brine well to function. The inside diameter of the brine well is dependent upon the specific valving and the diameter of the float.

SUMMARY OF THE INVENTION

Accordingly, it is a primary object of the present invention to provide a brine system which manufactures brine, maintains and controls its supply level, and dispenses it to the resin tank during regeneration, more effectively, more simply, and less expensively than systems presently in use.

Another object of the invention is to provide a brine system which permits the use of a smaller diameter brine well than heretofore known systems.

A further object is to provide a brine system which includes a double acting shut-off to ensure reliability in preventing brine overflow.

A still further object is to provide a brine system which includes means to prevent premature shut-off of the valve and permits a fast refill rate because a flow restrictor is not needed.

Another object of the invention is to provide a brine system which includes an accurate and simple brine adjustment and which may be used in brine drums of various heights.

These and other objects will be realized in accordance with the present invention which briefly stated includes a brine well positioned within a brine drum. A vertically adjustable air chamber, positioned within the brine well, activates a diaphragm and control arm assembly which in turn controls the inlet water shut-off valves when the water level within the drum reaches a predetermined level. The control arm has a unique cam arrangement associated therewith to prevent premature shut-off of the valves. Water enters and is withdrawn from the brine well through a down tube having a vertically adjustable lower end extending down into the brine well to a predetermined level and an upper end in communication with the shut-off valves through a series of passageways and chambers. A floating disc seal is provided within one of the chambers to shut-off the air entering the system when the brine is drawn down to a level below the lower end of the down tube.

BRIEF DESCRIPTION OF THE DRAWING

Other objects and many of the attendant advantages of this invention will be readily appreciated as the same becomes better understood by reference to the following detailed description, when considered in connection with the accompanying drawing, in which the FIGURE is a front sectional view of a portion of a brine tank including a brine system embodying features of the present invention.

DESCRIPTION OF A PREFERRED EMBODIMENT

Referring to the drawing, a brine system embodying features of the present invention is illustrated generally at 10. The brine system 10 is mounted within a conventional brine drum 12. It includes an upright cylinder 13 which separates a control compartment 14 within the cylinder from a brine compartment 15 without the cylinder.

Cylinder 13 extends through and is supported by a foraminous, horizontal, salt supporting platform 16 inside the drum. The platform 16 extends across the brine compartment 15 at a level spaced above the bottom of the drum and on it is maintained a layer of salt from which brine is formed according to the invention. The control campartment 14 is in communication with the brine compartment 15 through a series of vertically disposed slots 17 in the base of the cylinder.

The brine system 10 includes an assembly body 20 mounted in a closing relationship to the upper end of cylinder 13. Integrally formed within body 20 are chambers 30, 40, and 50 which are serially in fluid communication with one another through passages 35 and 45. Chamber 30 houses a pair of shut-off valves 32 and 34 which respectively close off passages 35 and 37 formed through valve seats 36 and 38. Shut-off valves 32 and 34 are positioned one on top of the other and are spaced apart such that as lower valve 32 is lifted from valve seat 36, it contacts upper valve 34 and lifts it off its valve seat 38. Valves 32 and 34 are of well known and similar construction and each respectively includes annular, resilient sealing lips 41 and 42 guided by stems 43 and 44, which extend respectively downward into passages 35 and 37. A fitting 39, threadedly received in body 20, closes off the retains valve seat 38 in place. Threaded opening 46 in fitting 39 is sized to receive conduit 47 from aspirator 48 (shown diagrammatically) to result in direct fluid communication between the upper portion of chamber 30 and aspirator 48.

Chamber 30 communicates with chamber 40 through passage 35 and chamber 40 communicates with the lower end of chamber 50 through passage 45. Positioned within chamber 50 is a floating disc seal 52 having an annular, resilient sealing lip 53 for closing off fluid communication through passage 45 when in its down position. Guide ribs 54 are provided to control the vertical movement of disc seal 52 and permit liquid to pass therebetween through passages 55, 56, and 57 and in X cylinder 13. A cap 58 is threadedly received in closing relationship to chamber 50.

Formed integrally with body 20 are a pair of fittings 62 and 64, having threaded lower ends, which extend downward into cylinder 13. A first down tube 66 has an upper end 67 received within fitting 62 and a lower end 68 which extends downward towards the bottom of cylinder 13. A locking nut 69 and O-ring 70 are provided to selectively secure upper end 67 to fitting 62. A second down tube 72 has an upper end 74 received within fitting 64 and a lower end 77 which extends downward into cylinder 13. A locking nut 75 and an O-ring 76 are provided to selectively secure upper end 74 to fitting 64. Secured to the lower end 77 is an inverted cup-shaped air chamber member 78 in fluid communication with tube 72. The elevation of the respective lower ends 68 and 77 of tubes 66 and 72 may be adjusted by vertical movement of the tubes in their respective fittings 62 and 64 after loosening of the locking nuts 69 and 75. Passage 57 is in fluid communication with tube 66 through fitting 62.

A cavity 80 is formed integrally with body 20 immediately above fitting 64 and is in communication therewith through passage 82. Extending across cavity 80 in closing relationship thereto is a flexible diaphragm member 84 having an upwardly extending rod 86 secured to a central portion thereof. A closure cap 88 is provided to secure diaphragm 84 against body 20 and to support rod 86 in a substantially vertical position through an integrally formed opening 89.

A control arm 90 is provided having a flat undersurface of a first end 92 thereof in contact with an upper surface of rod 86 and a second end 94 which extends into chamber 40. End 94 passes through a tapered opening 95 in a cover plate 96 which closes off chamber 40 from brine compartment 15. A flexible, annular seal 97 encircles arm 90 and is sandwiched in place between plate 96 and a cooperating portion of body 20. Arm 90 is pivotal about a substantially vertical plane passing through seal 97. The innermost portion of end 94 has a plurality of teeth 99 formed integral therewith which mesh with a pinion type gear 98 formed integral with a cam member 100 mounted within chamber 40 for rotation about a substantially horizontal axis. Cam member 100 has a cam surface 102 which is operative to contact valve stem 43 and thereby move valves 32 and 34 between their up and down positions as the cam member 100 is caused to rotate. The movement of diaphragm 84 is effective to vertically move rod 86, which in turn contacts and pivots control arm 90 and thereby causes cam member 100 to rotate and control the movement of valves 32 and 34.

Turning now to operation of the system, assume that the water conditioning system is in its normal service cycle, shortly before regeneration. The brine level in the brine compartment 15 and the control compartment 14 is at the preselected brine fill level, BFL. The brine level being above the level of the bottom of air chamber 78 forces the air trapped in air chamber 78 to lift diaphragm 84 and rod 86 which in turn pivots arm 90 to its position shown in phantom lines in the FIGURE so as to turn cam member 100 and allow shut-off valves 32 and 34 to seal respectively on seats 36 and 38. When in this condition, the water level in chamber 50 is such that disc seal 52 is at its up position as shown in the FIGURE.

When the other control valve signals for regeneration-brining of the ion exchange resin bed in the system treatment tank, the aspirator 48 is effective to create a suction in the conduit 46. This suction is effective to lift valves 32 and 34 from seats 36 and 38 and draw brine from cylinder 13 up through tube 66, the passages 57, 56, and 55, the chamber 50, the passage 45, the chamber 40, the passages 35 and 37, and the conduit 47 to the control valve for routing to the treatment tank. Brine continues to be drawn from the compartments 14 and 15 in the aforedescribed manner while suction is effective, that is, until the level of brine descends below the level of the bottom of the tube 66 indicated at BDL in the FIGURE. At this point, the brine within chamber 50 is withdrawn causing disc seal 52 to descend within the chamber 50 and sealing lip 53 to close off passage 45 and shut off air from entering the system. It will thus be seen that the amount of brine drawn from the system during regeneration is determined by the level of air chamber 78 which determines the BFL level and the bottom of tube 66 which determines the BDL level.

After the brining cycle, it is characteristic of this type of system that a slow rinse cycle follows. During this slow rinse cycle, the aspirator valve 48 continues to develop suction past the valves 32 and 34 but no brine is drawn, nor is air drawn into the system past disc seal 52. When the aforementioned timing device signals the end of the slow rinse, the aspirator valve 48 cuts off suction to the assembly 10, and normally, a brine tank refill function begins during the next cycle of regeneration or normal service softening in the service system.

Immediately prior to the initiation of the refill cycle, the level of brine within compartments 14 and 15 is at the level indicated at BDL, the diaphragm 84 is in its down position, and arm 90 is in its position as shown in solid lines in the FIGURE causing the shut-off valves 32 and 34 to be in their up or unseated positions. Refill water flows from the control valve through conduit 47 into chamber 30 and past valves 32 and 34 into chamber 40 and then flows into passage 45. The force of the water passing through passage 45 is sufficient to unseat disc seal 52 and permit the entry of the water into chamber 50. As the water fills chamber 50, the disc seal 52 rises to the top of chamber 50 and the water exits therefrom and flows serially through passages 55, 56, and 57 into fitting 62 and then down tube 66 into compartment 14. As the refill water continues flowing in the aforementioned manner, the water rises in compartments 14 and 15 until air is trapped in air chamber 78, forcing air to lift diaphragm 84 and rod 86 which in turn pivots arm 90 and thereby turns cam 100 which causes shut-off valves 32 and 34 to respectively seal on seats 36 and 38, closing off the passage of refill water through the system. The system is once more ready for the next regeneration brine draw cycle.

The brine fill level, BFL, can be varied to provide a means of controlling brine drawn according to the invention. To this end, the level of air chamber 78 is vertically adjustable by loosening locking nut 75 and raising and lowering tube 72 within fitting 64. Alternatively, the brine drawn can be controlled by varying the brine draw level, BDL. To this end, the level of the bottom of tube 66 is vertically adjustable by loosening locking nut 69 and raising or lowering tube 66 within fitting 62. This adjustability of tubes 66 and 72 also permits the brine system to be used on various height brine drums.

Other features of the brine system 10 of the present invention is the prevention of premature shut off of valves 32 and 34 due to air in the lines or excess water flow by the unique design of cam 100 and control arm 90. This permits a fast refill rate because flow restrictors are not needed. It should also be noted that all the valves are above the salt brine which ensures more reliability and easy access for repair.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A control system for a brine tank comprising; in combination:
    a. cylinder means positioned within said tank defining a control compartment inside said cylinder means and a brine compartment outside said cylinder means;
    b. perforations in a lower portion of said cylinder means to permit brine from said brine compartment to pass therethrough into said control compartment;
    c. first tube means extending into said control compartment for alternatively introducing water and removing brine;
    d. means associated with an upper end of said first tube means for alternatively introducing water into and drawing a vacuum on said first tube in accordance with a pre-selected cycle;
    e. shut-off valve means positioned within a first chamber for controlling the influx of refill water therethrough into said tank;
    f. second tube means extending into said control compartment having a lower end at a pre-selected level within said control compartment above the lower end of said first tube means;
    g. a second chamber, having a diaphragm means positioned therein, in fluid communication with an upper end of said second tube means such that said diaphragm means deflects relative to the changing air pressure within said second tube means as the water level in said control compartment reaches said lower end of said second tube means;
    h. actuation means associated with said shut-off valve means responsive to the deflection of said diaphragm means for movement of said shut-off valve means between an open and closed position dependent upon the water level in said control compartment; and
    i. means for adjusting the relative elevations of the lower ends of said first and second tube means for selectively controlling the quantity of brine draw.

2. The invention as defined in claim 1 wherein said actuation means includes a control arm, having a first end moveable in response to the deflection of said diaphragm means and a second end associated with said shut-off valve means, for translating movement of said diaphragm means to said shut-off valve means.

3. The invention as defined in claim 2 further including cam means for movement of said shut-off valve means between its open and closed positions, said second end of said control arm having teeth formed therein which are positioned in meshing relationship to a pinion gear formed integral with said cam means for rotation of said cam means upon vertical movement of said first end of said control arm.

4. The invention as defined in claim 3 wherein said lower end of said second tube means has an air chamber means in fluid communication therewith for trapping air therein as the level of liquid with said control compartment rises above the lower edges thereof.

5. The invention as defined in claim 4 wherein said shut-off valve means includes a first valve member positioned immediately below a second valve member, said first and second valve members tending towards their closed positions preventing the downward flow of refill water through said first chamber, and said cam means operative to open said first and second valve means permitting the flow of refill water through said first chamber.

6. The invention as defined in claim 5 further including a third chamber having a first passage through a lower end thereof in fluid communication with said first chamber and second passage in fluid communication with said first tube means, and float disc seal means vertically moveable within said second chamber for control of the brine flow through said second chamber.

7. The invention as defined in claim 5 wherein said actuation means includes a control arm, having a first end moveable in response to the deflection of said diaphragm means and a second end associated with said shut-off valve means, for translating movement of said diaphragm means to said shut-off valve means.

8. The invention as defined in claim 7 further including cam means for movement of said shut-off valve means between its open and closed positions, said second end of said control arm being operative to rotate said cam means and thereby move said shut-off valve meanss between said open and closed positions.

9. The invention as defined in claim 8 wherein said shut-off valve means includes a first valve member positioned immediately below a second valve member, said first and second valve members tending towards their closed positions preventing the downward flow of refill water through said first chamber, and said cam means operative to open said first and second valve means permitting the flow of refill water through said first chamber.

10. The invention as defined in claim 8 wherein said second end of said control arm has teeth formed therein which are positioned in meshing relationship to a pinion gear formed integral with said cam means for rotation of said cam means upon vertical movement of said first end of said control arm.

11. The invention as defined in claim 4 wherein said lower end of said second tube means has an air chamber means in fluid communication therewith for trapping air therein as the liquid level within said control compartment rises above the lower edges thereof.

12. A control system for a brine tank comprising; in combination:
  a. cylinder means positioned within said tank defining a control compartment inside said cylinder means and a brine compartment outside said cylinder means;
  b. perforations in a lower portion of said cylinder means to permit brine from said brine compartment to pass therethrough into said control compartment;
  c. a body assembly mounted in closing relationship to the upper end of said cylinder means;
  d. a first chamber in said body assembly for alternatively receiving refill water and removing brine;
  e. shut-off valve means postitioned within said first chamber for controlling the influx of refill water through said first chamber;
  f. a second chamber in said body assembly in fluid communication with said first chamber through a first passage which communicates with a bottom portion thereof;
  g. a float seal means positioned within said second chamber to close off fluid communication through said first passage when the liquid level within said second chamber reaches a predetermined low level;
  h. a first tube means extending into said control compartment having an upper end in fluid communication with said second chamber and a lower end in fluid communication with a lower portion of said control compartment;
  i. a second tube means extending into said control compartment having a lower end at a pre-selected level within said control compartment above the lower end of said first tube means;
  j. a third chamber in said body assembly, having a diaphragm means positioned thereacross, in fluid communication with an upper end of said second conduit means such that said diaphragm means deflects relative to the changing air pressure within said second tube means as the water level in said control compartment reaches said lower end of said second tube means;
  k. actuation means associated with said shut-off valve means responsive to the deflection of said diaphragm means for movement of said shut-off valve means between an open and closed position dependent upon the water level in said control compartment, and
  l. means for adjusting the relative elevations of the lower ends of said first and second tube means for selectively controlling the quantity of brine draw.

* * * * *